United States Patent
Iida et al.

(10) Patent No.: US 9,140,774 B2
(45) Date of Patent: Sep. 22, 2015

(54) VOICE ANALYZER, VOICE ANALYSIS SYSTEM, AND NON-TRANSITORY COMPUTER READABLE MEDIUM STORING A PROGRAM

(75) Inventors: Kiyoshi Iida, Kanagawa (JP); Haruo Harada, Kanagawa (JP); Hirohito Yoneyama, Kanagawa (JP); Kei Shimotani, Kanagawa (JP); Akira Fujii, Kanagawa (JP); Yohei Nishino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 483 days.

(21) Appl. No.: 13/554,687

(22) Filed: Jul. 20, 2012

(65) Prior Publication Data

US 2013/0191127 A1 Jul. 25, 2013

(30) Foreign Application Priority Data

Jan. 23, 2012 (JP) .................. 2012-011218

(51) Int. Cl.
*G10L 15/00* (2013.01)
*G01S 3/808* (2006.01)
*H04R 1/02* (2006.01)

(52) U.S. Cl.
CPC ............... *G01S 3/8083* (2013.01); *H04R 1/028* (2013.01); *H04R 2430/23* (2013.01)

(58) Field of Classification Search
CPC .................... G10L 15/20; G10L 17/00; G10L 2021/02082; G10L 15/24; G10L 2021/02165; G10L 21/0208; G10L 25/78; G10L 21/02; G10L 25/51; G10L 25/84; H04R 25/407; G10K 11/1782

USPC ............... 704/270, 231, 270.1, 246, 236, 215
See application file for complete search history.

(56) References Cited

U.S. PATENT DOCUMENTS

| | | | | |
|---|---|---|---|---|
| 5,778,082 | A * | 7/1998 | Chu et al. ....................... | 381/92 |
| 5,793,875 | A * | 8/1998 | Lehr et al. ..................... | 381/313 |
| 7,526,094 | B2 * | 4/2009 | Hickling ........................ | 381/91 |
| 8,155,328 | B2 * | 4/2012 | Kotegawa et al. ............. | 381/57 |
| 8,525,654 | B2 * | 9/2013 | Yoshizawa et al. ........... | 340/435 |
| 8,553,903 | B2 * | 10/2013 | Greywall ........................ | 381/92 |
| 2009/0290257 | A1 * | 11/2009 | Kimura et al. ............ | 360/125.13 |
| 2010/0211387 | A1 * | 8/2010 | Chen ............................. | 704/226 |
| 2010/0214086 | A1 * | 8/2010 | Yoshizawa et al. ........... | 340/435 |
| 2011/0091056 | A1 * | 4/2011 | Nishizaki et al. ............. | 381/312 |
| 2011/0103617 | A1 * | 5/2011 | Shin ............................... | 381/107 |
| 2012/0062729 | A1 * | 3/2012 | Hart et al. ...................... | 348/135 |
| 2012/0070009 | A1 * | 3/2012 | Ishii et al. ...................... | 381/56 |
| 2012/0114155 | A1 * | 5/2012 | Nishizaki et al. ............. | 381/313 |
| 2013/0297319 | A1 * | 11/2013 | Kim ............................... | 704/275 |

FOREIGN PATENT DOCUMENTS

JP    A-2002-165292    6/2002

* cited by examiner

*Primary Examiner* — Abdelali Serrou
(74) *Attorney, Agent, or Firm* — Oliff PLC

(57) ABSTRACT

A voice analyzer includes a plate-shaped body, a plurality of first voice acquisition units that are placed on both surfaces of the plate-shaped body and that acquire a voice of a speaker, a sound pressure comparison unit that compares sound pressure of a voice acquired by the first voice acquisition unit placed on one surface of the plate-shaped body with sound pressure of a voice acquired by the first voice acquisition unit placed on the other surface and determines a larger sound pressure, and a voice signal selection unit that selects information regarding a voice signal which is associated with the larger sound pressure and is determined by the sound pressure comparison unit.

8 Claims, 11 Drawing Sheets

ENLARGED

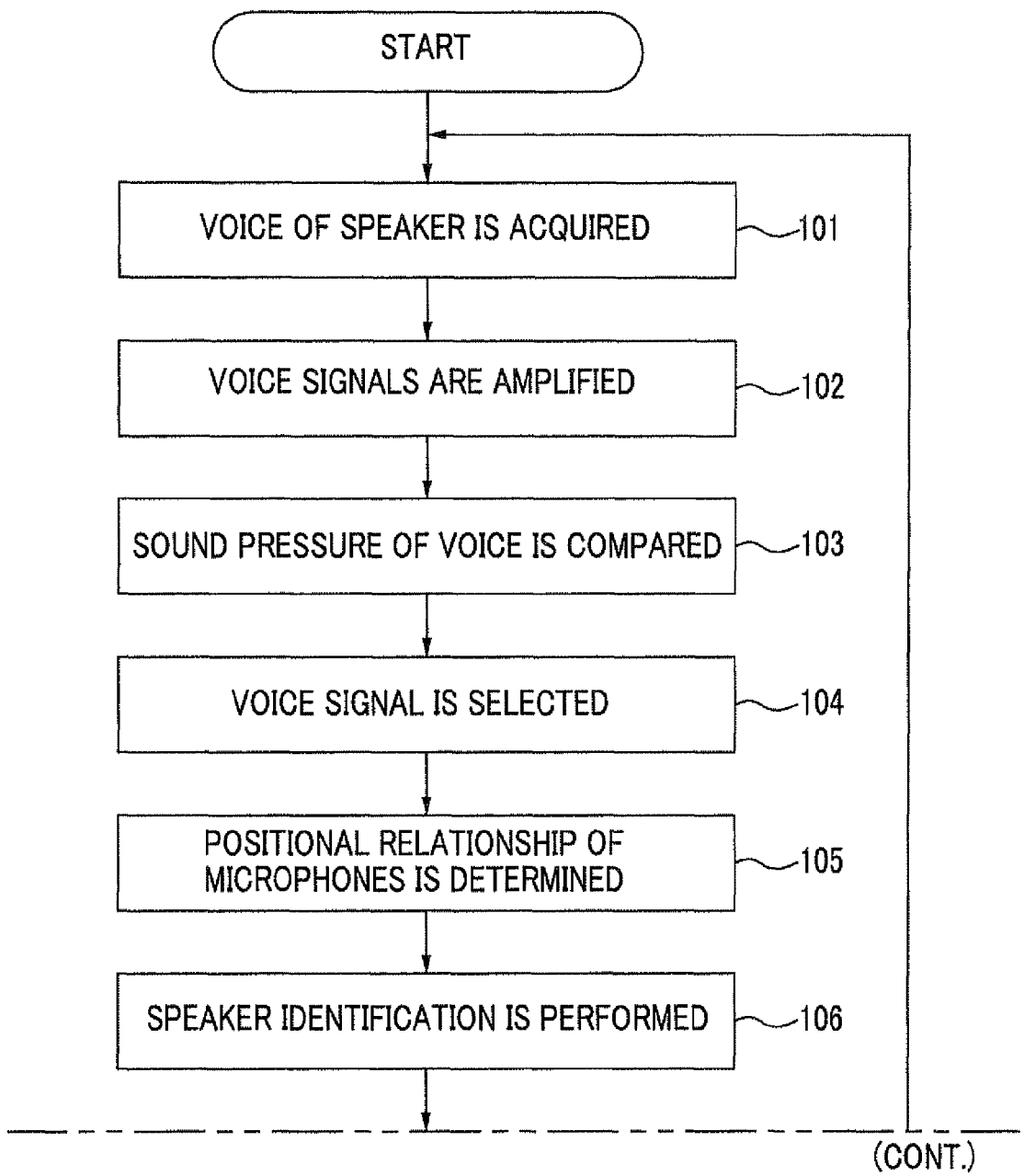

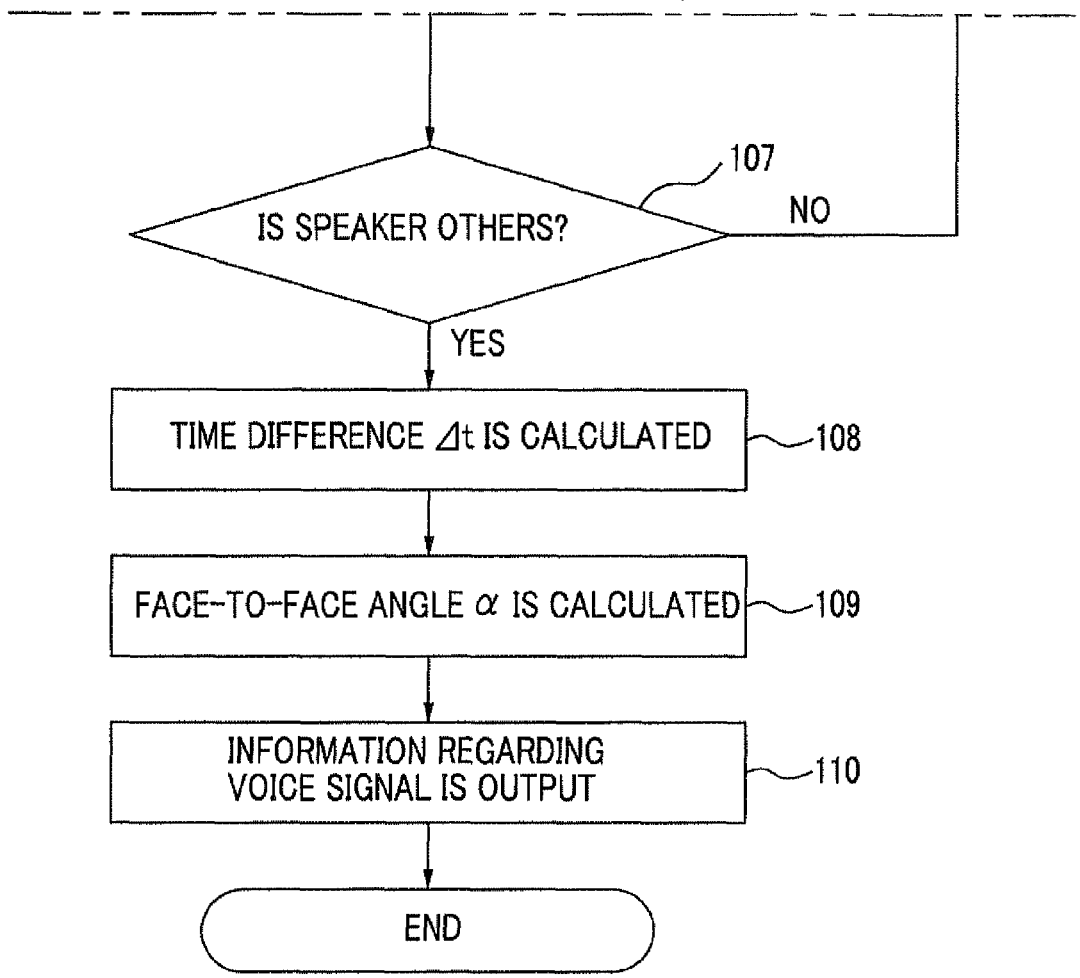

VOICE ANALYZER, VOICE ANALYSIS SYSTEM, AND NON-TRANSITORY COMPUTER READABLE MEDIUM STORING A PROGRAM

CROSS-REFERENCE TO RELATED APPLICATIONS

This application is based on and claims priority under 35 USC 119 from Japanese Patent Application No. 2012-011218 filed Jan. 23, 2012.

BACKGROUND

Technical Field

The present invention relates to a voice analyzer, a voice analysis system, and a non-transitory computer readable medium storing a program.

SUMMARY

According to an aspect of the invention, there is provided a voice analyzer including: a plate-shaped body; a plurality of first voice acquisition units that are placed on both surfaces of the plate-shaped body and that acquire a voice of a speaker; a sound pressure comparison unit that compares sound pressure of a voice acquired by the first voice acquisition unit placed on one surface of the plate-shaped body with sound pressure of a voice acquired by the first voice acquisition unit placed on the other surface and determines a larger sound pressure; and a voice signal selection unit that selects information regarding a voice signal which is associated with the larger sound pressure and is determined by the sound pressure comparison unit.

BRIEF DESCRIPTION OF THE DRAWINGS

Exemplary embodiments of the present invention will be described in detail based on the following figures, wherein:

FIG. 8 is a flow chart illustrating the operation of the terminal apparatus.

DETAILED DESCRIPTION

Hereinafter, an exemplary embodiment of the invention will be described in detail with reference to the accompanying drawings.

Example of the System Configuration

Figure 1:
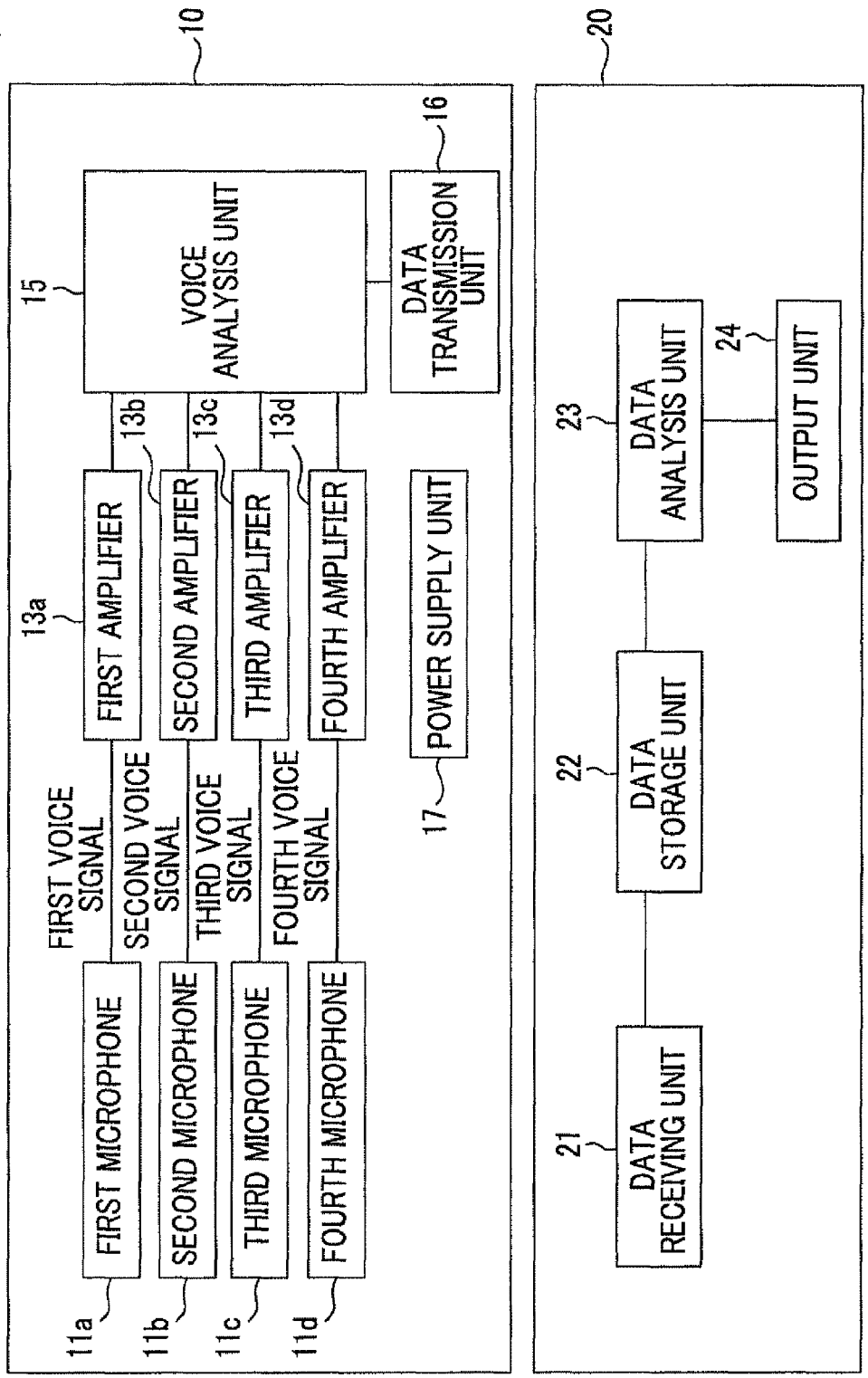
FIG. 1 is a view showing an example of the configuration of a voice analysis system according to an exemplary embodiment.

FIG. 1 is a view showing an example of the configuration of a voice analysis system according to the present exemplary embodiment.

As shown in FIG. 1, a voice analysis system 1 according to the present exemplary embodiment is configured to include a terminal apparatus 10, which is an example of a voice analyzer (voice analysis apparatus), and a host apparatus 20. The terminal apparatus 10 and the host apparatus 20 are connected to each other through a radio communication line. As types of the radio communication line, lines based on the known methods, such as Wi-Fi (Wireless Fidelity), Bluetooth (registered trademark), ZigBee, and UWB (Ultra Wideband), may be used. In addition, although only one terminal apparatus 10 is described in the example shown in FIG. 1, a number of terminal apparatuses 10 equal to the number of users are prepared in practice, since the terminal apparatus 10 is used while worn by the user. This will be described in detail later.

The terminal apparatus 10 includes plural microphones 11 (a first microphone 11a, a second microphone 11b, a third microphone 11c, and a fourth microphone 11d) and plural amplifiers 13 (a first amplifier 13a, a second amplifier 13b, a third amplifier 13c, and a fourth amplifier 13d) as examples of plural voice acquisition units that acquire the voice of a speaker (Hereinafter, described as microphones 11a, 11b, 11c, and 11d when the first microphone 11a, the second microphone 11b, the third microphone 11c, and the fourth microphone 11d are not distinguished). In addition, the terminal apparatus 10 includes a voice analysis unit 15 that analyzes the acquired voice and a data transmission unit 16 that transmits the analysis result to the host apparatus 20, and further includes a power supply unit 17.

In the present exemplary embodiment, the first and second microphones 11a and 11b are placed so as to be separated from each other by a distance set in advance in the horizontal direction. Here, the first and second microphones 11a and 11b are placed at the positions near the mouth of a wearer so as to be located side by side in the horizontal direction. The distance between the first and second microphones 11a and 11b is 10 cm to 20 cm, for example.

In addition, the third and fourth microphones 11c and 11d are placed on both sides of the plate-shaped body 30 which will be described later. In addition, the third and fourth microphones 11c and 11d are placed at the positions far from the mouth (speaking portion) of the wearer, compared with the first and second microphones 11a and 11b. Here, the third and fourth microphones 11c and 11d are placed about 35 cm below the first and second microphones 11a and 11b, for example. That is, in the present exemplary embodiment, two microphones whose distances from the mouth of the wearer are different and two microphones separated from each other in the horizontal direction may be selected as microphones placed in the terminal apparatus 10. Here, a pair of the first microphone 11a and the third microphone 11c (or the fourth microphone 11d) and a pair of the second microphone 11b and the third microphone 11c (or the fourth microphone 11d) may be selected as the former case. In addition, as the latter case, a pair of the first microphone 11a and the second microphone 11b may be selected.

Various types of known microphones, such as dynamic type microphones and capacitor type microphones, may be used as the microphones 11a, 11b, 11c, and 11d in the present exemplary embodiment. In particular, it is preferable to use a non-directional MEMS (Micro Electra Mechanical Systems) type microphone.

The first to fourth amplifiers 13a to 13d amplify electrical signals that the first to fourth microphones 11a to 11d output, according to the acquired voice. Known operational amplifiers or the like may be used as the first to fourth amplifiers 13a to 13d in the present exemplary embodiment.

The voice analysis unit 15 analyzes the electrical signals output from the first to fourth amplifiers 13a to 13d. In addition, the voice analysis unit 15 determines the front and back of the body 30 and also identifies whether the speaker is a wearer or others and outputs a face-to-face angle, which is an angle at which the wearer and the speaker face each other, when the speaker is identified to be others. This will be described in detail later.

The data transmission unit 16 transmits the acquired data including the analysis result of the voice analysis unit 15 and the ID of the terminal apparatus 10 to the host apparatus 20 through the radio communication line. As the information transmitted to the host apparatus 20, not only the analysis result, but also information regarding the voice acquisition time, sound pressure of the acquired voice, and the like of the microphones 11a to 11d may be included according to processing performed in the host apparatus 20. In addition, a data storage unit that stores the analysis result of the voice analysis unit 15 may be provided in the terminal apparatus 10, and data stored for a certain period of time may be collectively transmitted. In addition, transmission using cables is also possible. In the present exemplary embodiment, the data transmission unit 16 functions as a voice signal transmission unit that transmits information of a voice signal of the voice.

The power supply unit 17 supplies electric power to the microphones 11a to 11d, the first to fourth amplifiers 13a to 13d, the voice analysis unit 15, and the data transmission unit 16. As the power supply, it is possible to use known power supplies, such as a dry battery and a rechargeable battery, for example. In addition, the power supply unit 17 includes known circuits, such as a voltage conversion circuit and a charging control circuit, when necessary.

The host apparatus 20 includes a data receiving unit 21 that receives the data transmitted from the terminal apparatus 10, a data storage unit 22 that stores the received data, a data analysis unit 23 that analyzes the stored data, and an output unit 24 that outputs the analysis result. The host apparatus 20 is realized by an information processing apparatus, such as a personal computer, for example. Moreover, in the present exemplary embodiment, the plural terminal apparatuses 10 are used as described above, and the host apparatus 20 receives the data from each of the plural terminal apparatuses 10.

The data receiving unit 21 corresponds to the radio communication line described above, and receives the data from each terminal apparatus 10 and transmits it to the data storage unit 22. In the present exemplary embodiment, the data receiving unit 21 functions as a receiving unit that receives information regarding a voice signal transmitted from the data transmission unit 16. The data storage unit 22 stores the received data acquired from the data receiving unit 21 according to the speaker. Here, speaker identification is performed by checking a terminal ID transmitted from the terminal apparatus 10 and a speaker name and a terminal ID registered in the host apparatus 20 in advance. Alternatively, it is also possible to transmit a wearer state instead of the terminal ID from the terminal apparatus 10.

The data analysis unit 23 analyzes the data stored in the data storage unit 22. As the specific analysis content and analysis method, various kinds of content and methods may be adopted depending on the purpose or aspect of use of the system according to the present exemplary embodiment. For example, the frequency of conversation between wearers of the terminal apparatuses 10 or the tendencies of a conversation partner of each wearer are analyzed, or the relationship between speakers in a conversation is estimated from the information regarding the length or sound pressure of the voice in the conversation.

The output unit 24 outputs the analysis result of the data analysis unit 23 or performs output based on the analysis result. As a unit that outputs the analysis result or the like, various kinds of units including display of a display device, printout using a printer, and voice output may be adopted according to the purpose or aspect of use of the system, the content or format of an analysis result, and the like.

Example of the Configuration of a Terminal Apparatus

Figure 2:
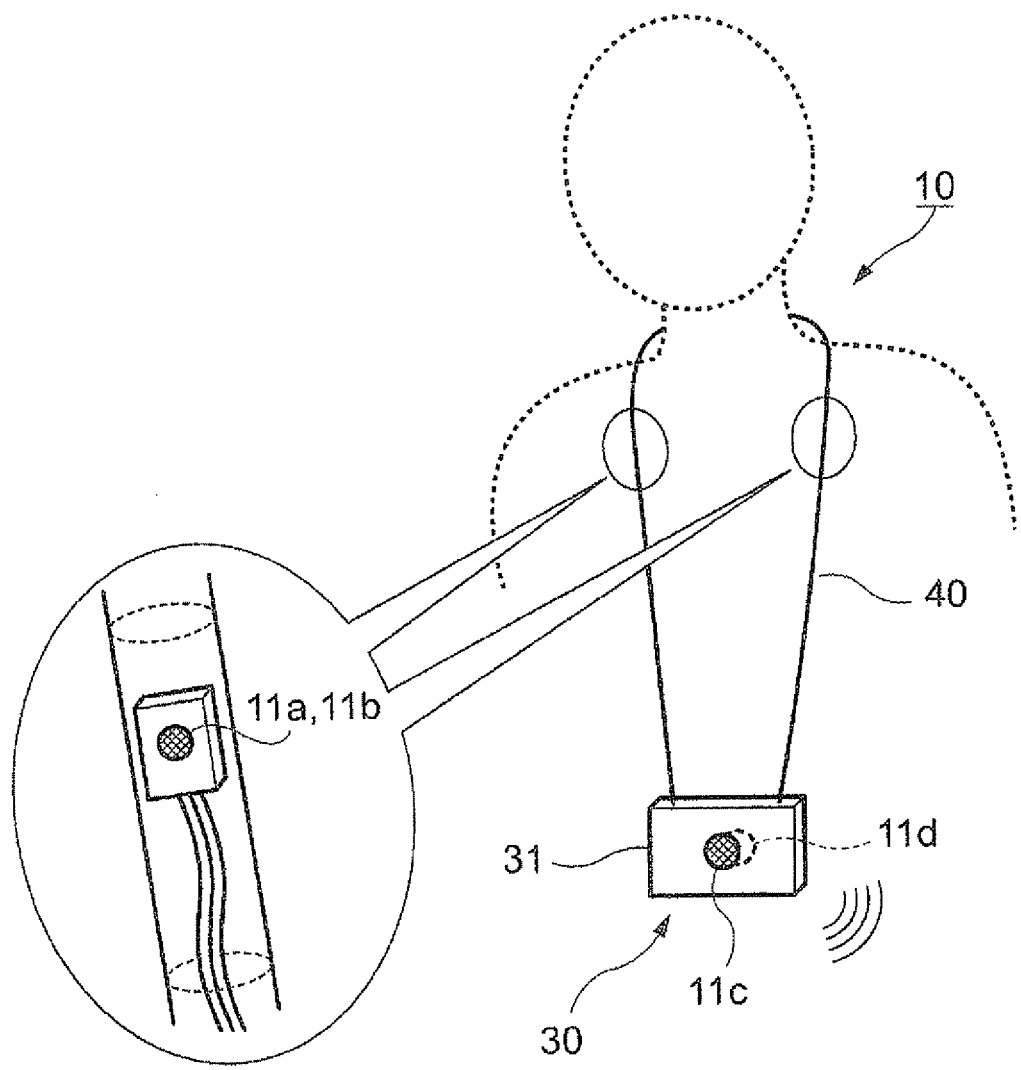
FIG. 2 is a view showing an example of the configuration of a terminal apparatus.

FIG. 2 is a view showing an example of the configuration of the terminal apparatus 10.

As described above, the terminal apparatus 10 is used in a state worn by each user. As shown in FIG. 2, the terminal apparatus 10 in the present exemplary embodiment is configured to include the body 30 and a strap 40 as an example of a string member, of which both ends are connected to the body 30 to form a ring shape, so that the user may wear the terminal apparatus 10. In the present exemplary embodiment, the strap 40 is connected to the body 30 in a state where both the ends of the strap 40 are separated from each other by a predetermined distance in the horizontal direction of the body 30. In addition, in the configuration shown in FIG. 2, the user wears the strap 40 on the neck so that the body 30 is hung from the neck. In addition, in the present exemplary embodiment, the user who wears the terminal apparatus 10 may be expressed as a wearer.

The body 30 is configured such that at least circuits for realizing the first to fourth amplifiers 13a to 13d, the voice analysis unit 15, the data transmission unit 16, and the power supply unit 17 and a power supply (battery) of the power supply unit 17 are housed in a plate-shaped case 31, for example, a rectangular parallelepiped thin case 31 formed of metal, resin, or the like. In addition, in the present exemplary embodiment, the third and fourth microphones 11c and 11d are provided on both sides of the case 31. In addition, a pocket through which an ID card, on which ID information such as the name or team of the wearer is displayed, is inserted may be provided in the case 31. In addition, such ID information or the like may be written on the surface of the case 31 itself.

In addition, the body 30 does not need to be a rigid body or does not need to be a rectangle. Accordingly, the body 30 may be formed by materials, such as cloth, which is neither rigid nor rectangular. For example, the body 30 may be a cloth bib or an apron to which required members (microphones 11a, 11b, 11c, and 11d and the like) are attached.

The first and second microphones 11a and 11b are provided in the strap 40. As materials of the strap 40, it is possible to use known various materials, such as leather, synthetic leather, cotton, other natural fibers, synthetic fiber using resin, and metal. In addition, coating processing using silicon resin, fluorine resin, or the like may be performed.

The strap 40 has a cylindrical structure, and the microphones 11a and 11b are housed inside the strap 40. By providing the microphones 11a and 11b inside the strap 40, it is possible to prevent damage or contamination of the microphones 11a and 11b, and it is suppressed that a speaker in a conversation is aware of the presence of the microphones 11a and 11b.

Explanation Regarding a Method of Identifying Whether a Speaker is a Wearer or Others A method of identifying whether the speaker is a wearer or others who are persons other than the wearer (speaker identification) in the above configuration will be described.

The system according to the present exemplary embodiment identifies a voice of the wearer of the terminal apparatus 10 or voices of others using the voice information acquired, for example, by the first and third microphones 11a and 11c among the microphones provided in the terminal apparatus 10. In other words, in the present exemplary embodiment, it is identified whether the speaker of the acquired voice is a wearer or others. In addition, in the present exemplary embodiment, speaker identification is performed on the basis of non-linguistic information, such as sound pressure (volume input to the first and third microphones 11a and 11c), instead of linguistic information acquired using morphological analysis or dictionary information, among information items of the acquired voice. That is, a speaker of the voice is identified from the speaking situation specified by the non-linguistic information instead of the content of speaking specified by the linguistic information.

As described with reference to FIGS. 1 and 2, in the present exemplary embodiment, the third microphone 11c of the terminal apparatus 10 is placed at the position far from the mouth (speaking portion) of the wearer and the first microphone 11a is placed at the position near the mouth (speaking portion) of the wearer. That is, assuming that the mouth (speaking portion) of the wearer is a sound source, the distance between the first microphone 11a and the sound source is greatly different from the distance between the third microphone 11c and the sound source. For example, the distance between the first microphone 11a and the sound source may be set to about 1.5 to 4 times the distance between the third microphone 11c and the sound source. Here, sound pressure of the acquired voice in each of the microphones 11a and 11c decreases (distance-decreases) as the distance between each of the microphones 11a and 11c and the sound source increases. Therefore, for the voice of the wearer, the sound pressure of the acquired voice in the first microphone 11a is greatly different from the sound pressure of the acquired voice in the third microphone 11c.

On the other hand, assuming that the mouth (speaking portion) of a person other than the wearer (another person) is a sound source, the distance between the first microphone 11a and the sound source and the distance between the third microphone 11c and the sound source do not change greatly since another person is separated from the wearer. Although there may be a difference between both the distances depending on the position of another person with respect to the wearer, the distance between the first microphone 11a and the sound source is not several times the distance between the third microphone 11c and the sound source unlike the case when the mouth (speaking portion) of the wearer is a sound source. Therefore, for the voice of another person, the sound pressure of the acquired voice in the first microphone 11a is not largely different from the sound pressure of the acquired voice in the third microphone 11c unlike the case of the voice of the wearer.

In the present exemplary embodiment, therefore, the sound pressure ratio, which is a ratio between the sound pressure of the acquired voice in the first microphone 11a and the sound pressure of the acquired voice in the third microphone 11c, is calculated. In the present exemplary embodiment, therefore, a voice of the wearer and voices of others in the acquired voices are identified using the difference of the sound pressure ratio. More specifically, in the present exemplary embodiment, a threshold value of the ratio between the sound pressure of the first microphone 11a and the sound pressure of the third microphone 11c is set. In addition, a voice with a larger sound pressure ratio than the threshold value is determined to be the voice of the wearer, and a voice with a smaller sound pressure ratio than the threshold value is determined to be the voice of another person.

In addition, although the speaker identification is performed using the first and third microphones 11a and 11c in the example described above, the invention is not limited to this, and the same is true even if the second and third microphones 11b and 11c are used.

In addition, although the speaker identification is performed on the basis of the sound pressure of the voices acquired by the first and third microphones 11a and 11c in the example described above, adding information regarding the phase difference between the acquired voices for the identification may also be considered. That is, assuming that the mouth (speaking portion) of the wearer is a sound source, the distance between the first microphone 11a and the sound source is greatly different from the distance between the third microphone 11c and the sound source as described above. For this reason, the phase difference between the voice acquired by the first microphone 11a and the voice acquired by the third microphone 11c is increased. On the other hand, assuming that the mouth (speaking portion) of a person other than the wearer (another person) is a sound source, the distance between the first microphone 11a and the sound source and the distance between the third microphone 11c and the sound source do not change greatly since another person is separated from the wearer, as described above. For this reason, the phase difference between the voice acquired by the first microphone 11a and the voice acquired by the third microphone 11c is reduced. Therefore, the accuracy of the speaker identification is improved by taking into consideration the phase difference between the voices acquired by the first and third microphones 11a and 11c.

Explanation Regarding the Face-to-Face Angle

Figure 3:
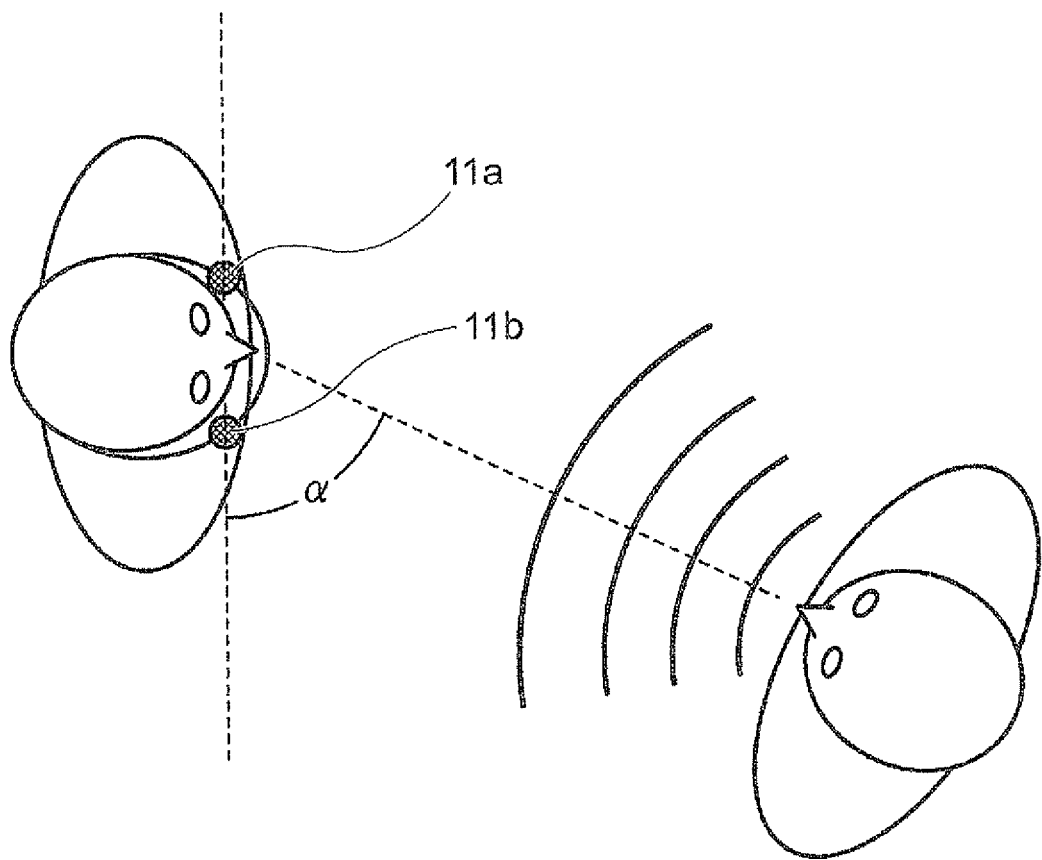
FIG. 3 is a view illustrating a face-to-face angle in the exemplary embodiment.

FIG. 3 is a view illustrating the face-to-face angle in the present exemplary embodiment.

In the present exemplary embodiment, the face-to-face angle is an angle between a wearer of the terminal apparatus 10 and a speaker facing the wearer. In addition, FIG. 3 shows a horizontal face-to-face angle as an example of the face-to-face angle defined in the present exemplary embodiment. That is, FIG. 3 is a view when the wearer and the speaker are viewed from above their heads. In addition, in the present exemplary embodiment, an angle between the line segment, which connects the first and second microphones 11a and 11b that are two voice acquisition units, and the line segment, which connects the midpoint of the above line segment with the speaker, is adopted as the face-to-face angle $\alpha$. In this manner, mathematical handling of the face-to-face angle becomes easier. In addition, when this definition is adopted, for example, when the wearer and the speaker face each other in front of each other, the face-to-face angle $\alpha$ between two persons is 90°.

Explanation Regarding a Method of Calculating the Face-to-Face Angle

Figure 4:
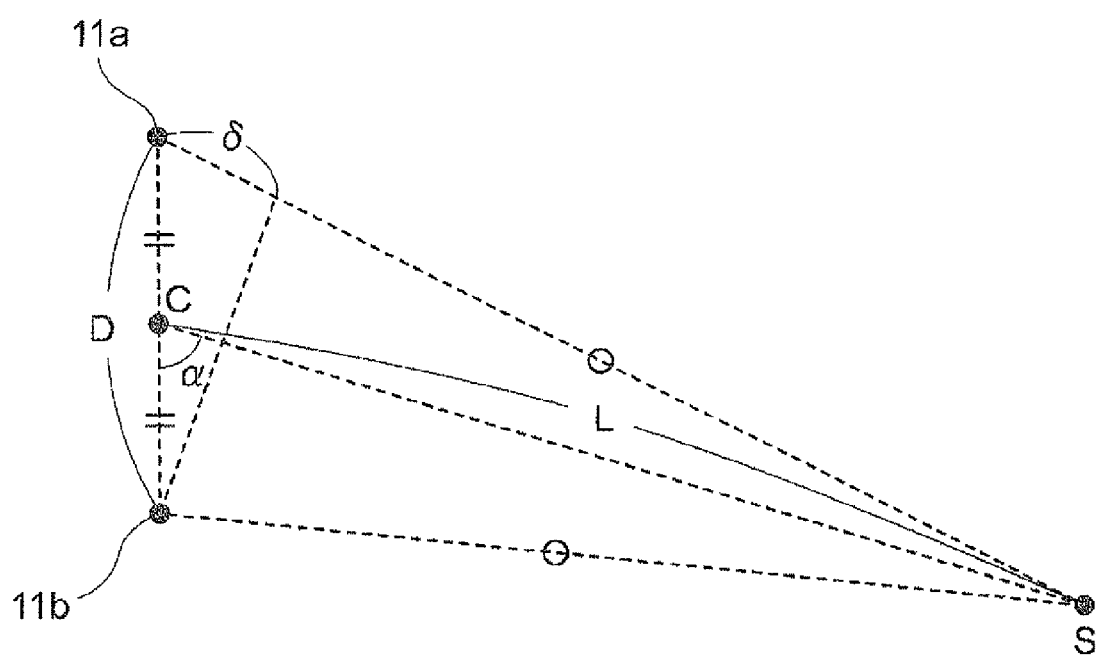
FIG. 4 is a view illustrating a method of calculating the face-to-face angle using first and second microphones.

FIG. 4 is a view illustrating a method of calculating the face-to-face angle $\alpha$ using the first and second microphones 11a and 11b.

Here, it is assumed that a point S is the position of the speaker, more precisely, the position of a speaking point which is a sound source of the voice of the speaker. In addition, the voice emitted from the speaking point spreads concentrically from the point S. However, since the voice spreads at the speed of sound which is a limited speed, time taken until the voice reaches the first microphone 11a is different from time taken until the voice reaches the second microphone 11b. As a result, a time difference $\Delta t$ corresponding to the voice path difference $\delta$ occurs. In addition, assuming that the distance between the first and second microphones 11a and $11b$ is D and the distance between the midpoint C and the point S is L, the following Expression (1) is satisfied.

$$\delta=(L^2+LD\cos\alpha+D^2/4)^{0.5}-(L^2-LD\cos\alpha+D^2/4)^{0.5} \quad (1)$$

If L>D, the influence of L is small. Accordingly, Expression (1) may be approximated to the following Expression (2).

$$\delta \cong D\cos\alpha \quad (2)$$

In addition, if the sound speed c and the time difference $\Delta t$ are used, the following Expression (3) is satisfied.

$$\delta=c\Delta t \quad (3)$$

That is, the face-to-face angle $\alpha$ may be calculated using Expressions (2) and (3). That is, the face-to-face angle $\alpha$ which is an angle between the wearer and the speaker facing each other may be calculated on the basis of the time difference $\Delta t$ when the voice of the speaker reaches the first and second microphones $11a$ and $11b$, which are two voice acquisition units, and the distance D between the first and second microphones $11a$ and $11b$.

In addition, the time difference $\Delta t$ when the voice of the speaker reaches the first and second microphones $11a$ and $11b$ may be calculated as follows.

Figure 5A:
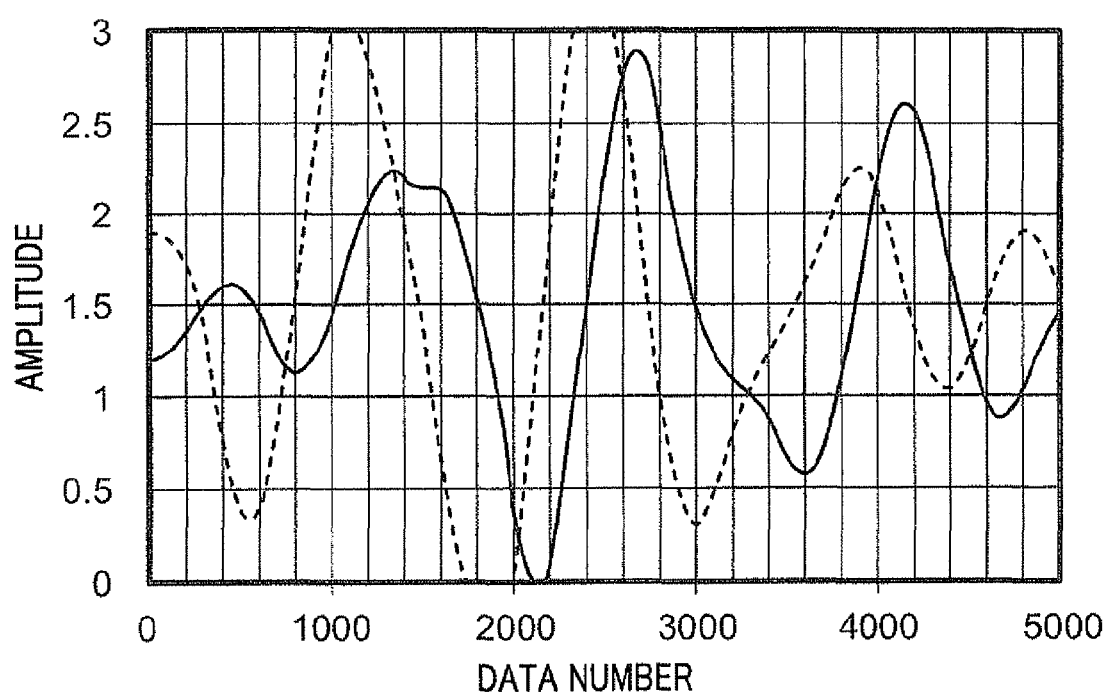
FIGS. 5A to 5C are views illustrating a method of calculating the time difference in the exemplary embodiment.
Figure 5B:
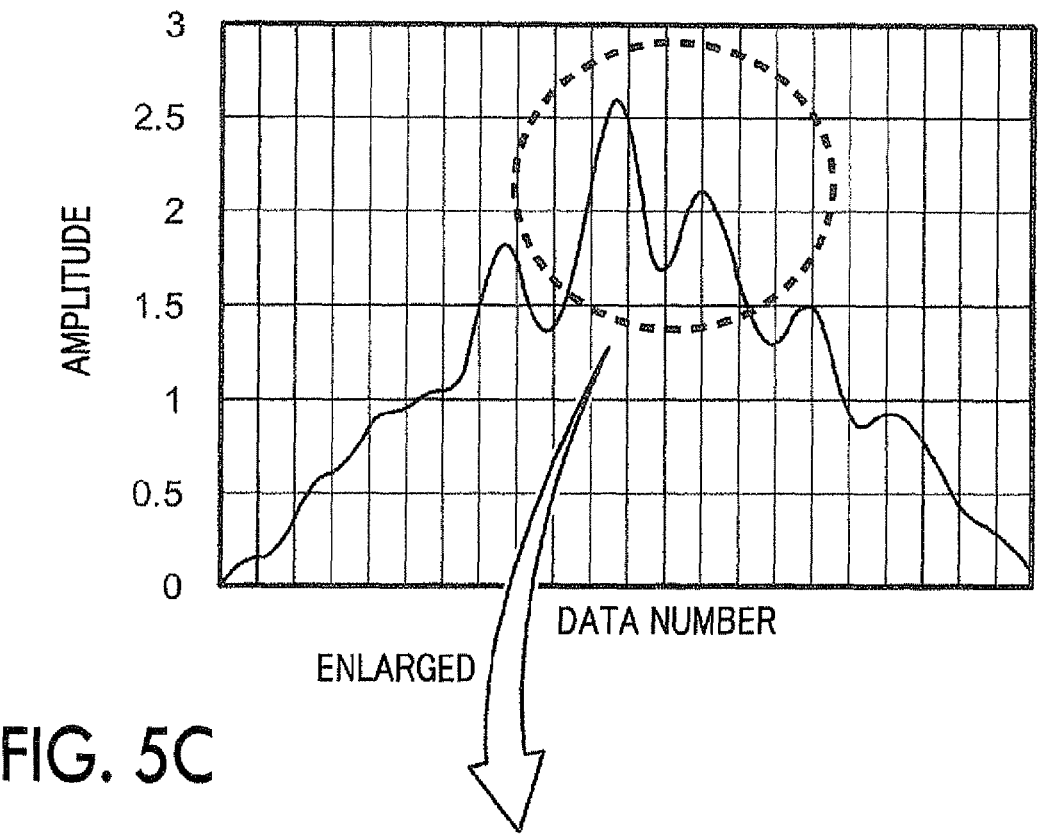
Figure 5C:
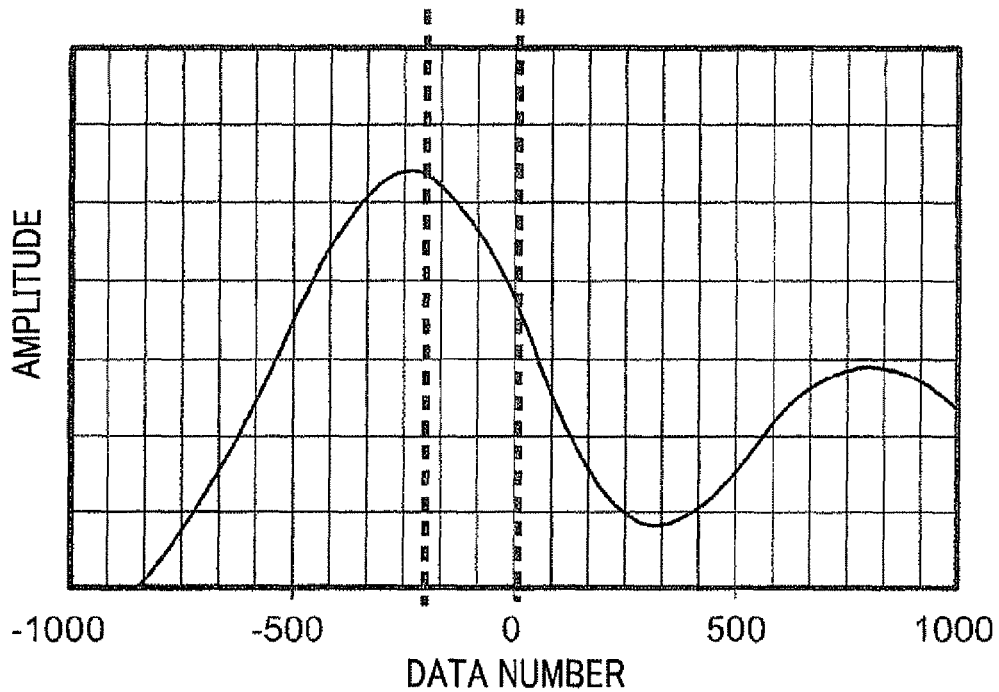

FIGS. 5A to 5C are views illustrating a method of calculating the time difference $\Delta t$ in the present exemplary embodiment. FIG. 5A is a view when the voice of a speaker reaching the first and second microphones $11a$ and $11b$ is sampled at the sampling frequency of 1 MHz and consecutive 5000 points are extracted from the data.

Here, the horizontal axis indicates a data number given to the data of 5000 points, and the vertical axis indicates the amplitude of the voice of a speaker. In addition, the solid line indicates a waveform signal of the voice of the speaker reaching the first microphone $11a$, and the dotted line indicates a waveform signal of the voice of the speaker reaching the second microphone $11b$.

In the present exemplary embodiment, a cross-correlation function of these two waveform signals is calculated. That is, one waveform signal is fixed and the other waveform signal is shifted for calculation which takes the sum of products. FIGS. 5B and 5C are views showing a cross-correlation function of these two waveform signals. FIG. 5B is a cross-correlation function of all data items of the sampled 5000 points, and FIG. 5C is an enlarged view of the vicinity of the peak of the cross-correlation function shown in FIG. 5B. In addition, FIGS. 5B and 5C show the case where the cross-correlation function is calculated by fixing a waveform signal of the voice of the speaker reaching the first microphone $11a$ and shifting a waveform signal of the voice of the speaker reaching the second microphone $11b$.

As shown in FIG. 5C, the peak position with the data number 0 as a reference is shifted by −227 points. This means that the voice of the speaker reaching the second microphone $11b$ is delayed by the −227 points with the first microphone $11a$ as a reference. Since the sampling frequency in the present exemplary embodiment is 1 MHz as described above, time between the sampled data is $1\times 10^{-6}$ (s). Accordingly, this delay time is set to $227\times 1\times 10^{-6}$ (s)=227 (μs). That is, the time difference $\Delta t$ in this case is 227 (μs).

Moreover, in the present exemplary embodiment, the amplitude is divided into predetermined frequency bands and large weighting is given to the frequency band with the largest amplitude, thereby calculating the cross-correlation function. The time difference $\Delta t$ calculated in this manner is more accurate. In addition, in order to calculate the time difference $\Delta t$ more accurately, it is preferable that the distance between the first and second microphones $11a$ and $11b$ fall within the range of 1 cm to 100 cm. If the distance between the first and second microphones $11a$ and $11b$ is less than 1 cm, the time difference $\Delta t$ becomes too small. As a result, the error of the face-to-face angle derived thereafter tends to be large. In addition, if the distance between the first and second microphones $11a$ and $11b$ is larger than 100 cm, the influence of the reflected voice when deriving the time difference $\Delta t$ is increased. In addition, when calculating the cross-correlation function, it is necessary to perform calculation for the longer time width. As a result, the load required for the calculation is increased.

Explanation Regarding the Wearing State of a Terminal Apparatus

Meanwhile, when the wearer wears the terminal apparatus 10, the front and back may be reversed unlike the case shown in FIG. 2.

Figure 6A:
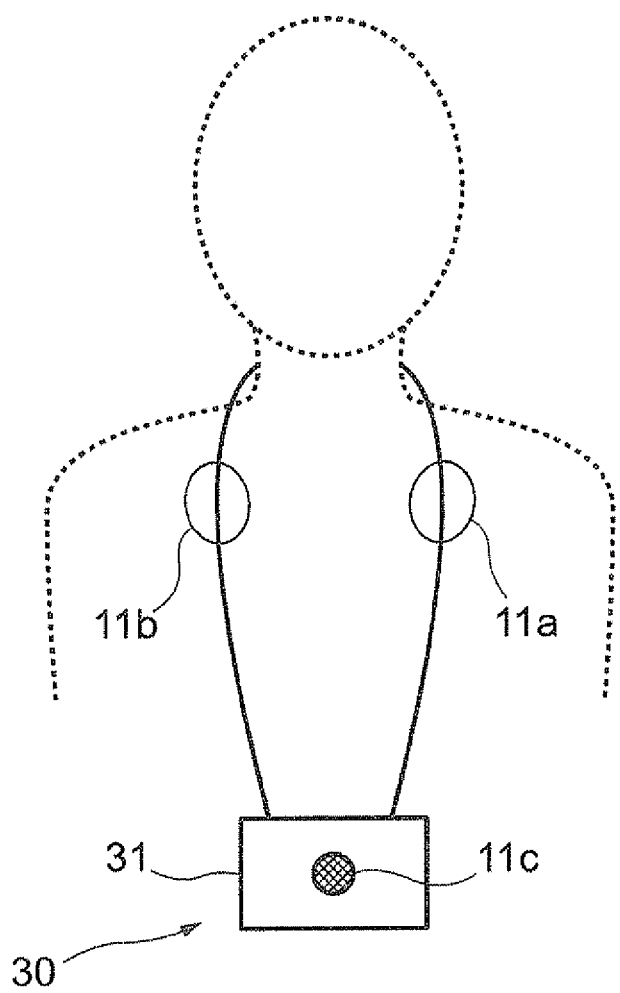
FIGS. 6A and 6B are views illustrating a normal wearing state of the terminal apparatus and a case where the terminal apparatus is worn with its front and back reversed.
Figure 6B:
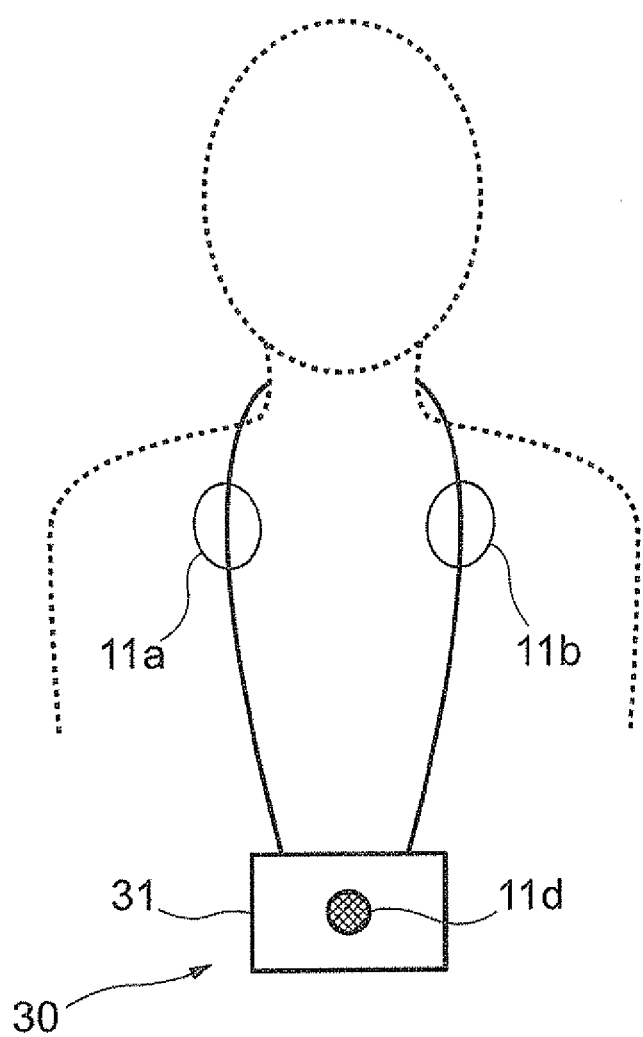

FIGS. 6A and 6B are views illustrating a normal wearing state of the terminal apparatus 10 and a case where the terminal apparatus 10 is worn with its front and back reversed.

Here, FIG. 6A shows a normal wearing state of the terminal apparatus 10, which is the same wearing state as in the case shown in FIG. 2. In this case, the positional relationship of the microphones $11a$, $11b$, $11c$, and $11d$ of the terminal apparatus 10 is as follows. When viewed from the wearer, the first microphone $11a$ is located on the left side and the second microphone $11b$ is located on the right side. In addition, the third microphone $11c$ faces the outside of the wearer, and the fourth microphone $11d$ faces the inside of the wearer, that is, the wearer side.

On the other hand, FIG. 63 shows a wearing state when the terminal apparatus 10 is worn with its front and back reversed. In this case, the positional relationship of the microphones $11a$, $11b$, $11c$, and $11d$ of the terminal apparatus 10 is as follows. When viewed from the wearer, the first microphone $11a$ is located on the right side and the second microphone $11b$ is located on the left side. In addition, the third microphone $11c$ faces the inside of the wearer, and the fourth microphone $11d$ faces the outside of the wearer.

In addition, when the terminal apparatus 10 is worn in the state shown in FIG. 6B, the positional relationship of the microphones $11a$, $11b$, $11c$, and $11d$ is different from that in the normal state. In particular, when calculating the face-to-face angle $\alpha$ described above, opposite results at the left and right sides are derived.

Moreover, in the present exemplary embodiment, as described above, the strap 40 is connected to the body 30 in a state where both the ends of the strap 40 are separated from each other by a predetermined distance in the horizontal direction of the body 30. Therefore, the positional relationship in the horizontal direction between the microphones $11a$ and $11b$ provided in the strap 40 and the positional relationship between the front and back of the microphones $11c$ and $11d$ placed on both surfaces of the body 30 are associated with each other. That is, it is hard for only the body 30 to rotate. Accordingly, when the third microphone $11c$ faces the outside of the wearer, the first microphone $11a$ is located on the left side and the second microphone $11b$ is located on the right side when viewed from the wearer (the case of FIG. 6A). In addition, when the fourth microphone $11d$ faces the outside of the wearer, the second microphone $11b$ is located on the left side and the first microphone $11a$ is located on the right side when viewed from the wearer (the case of FIG. 6B). In addition, when the wearer wears the terminal apparatus 10, one of the two cases occurs.

In the present exemplary embodiment, therefore, the positional relationship of the microphones 11a 11b, 11c, and 11d is checked to determine to which of the two wearing states the current state corresponds.

Explanation Regarding a Voice Analysis Unit

Figure 7:
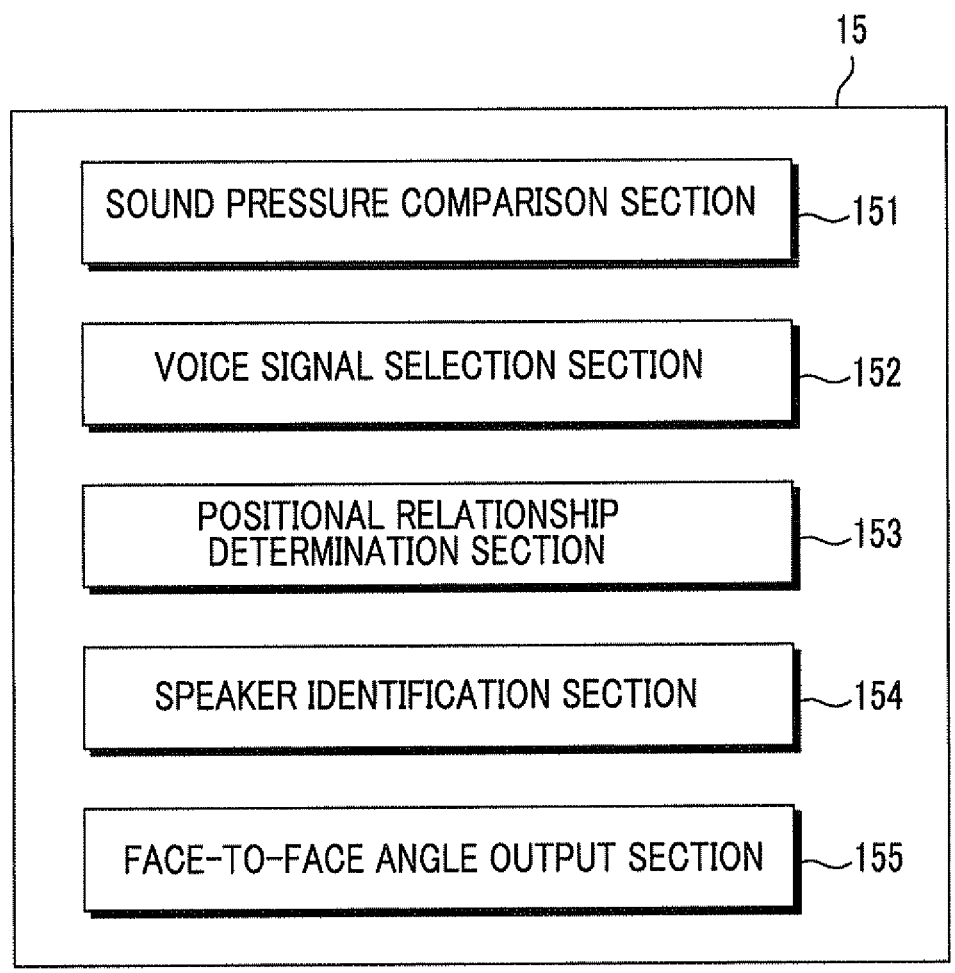
FIG. 7 is a view illustrating a voice analysis unit.

FIG. 7 is a view illustrating the voice analysis unit 15.

The voice analysis unit shown in FIG. 7 includes: a sound pressure comparison section 151 that compares sound pressure of the voice acquired by the third microphone 11c placed on one surface of the body 30 with sound pressure of the voice acquired by the fourth microphone 11d placed on the other surface and determines a larger sound pressure; a voice signal selection section 152 that selects information regarding a voice signal which is associated with the larger sound pressure and is determined by the sound pressure comparison section; a positional relationship determination section 153 that determines the positional relationship of the microphones 11a, 11b, 11c, and 11d; a speaker identification section 154 that identifies whether a speaker is a wearer or others who are persons other than the wearer (speaker identification) on the basis of the positional relationship of the microphones 11a, 11b, 11c, and 11d determined by the positional relationship determination section 153 and the sound pressure difference between the voices, which are acquired by two microphones whose distances from the mouth of the wearer are different, among the comparison results of the sound pressure comparison section 151; and a face-to-face angle output section 155 that outputs the face-to-face angle $\alpha$.

In addition, FIG. 8 is a flow chart illustrating the operation of the terminal apparatus 10. Hereinafter, the operation of the terminal apparatus 10 will be described using FIGS. 2, 7, and 8.

First, the microphones 11a, 11b, 11c, and 11d acquire the voice of the speaker (step 101). Then, the first to fourth amplifiers 13a to 13d amplify voice signals from the microphones 11a to 11d, respectively (step 102).

Then, the amplified voice signals are transmitted to the voice analysis unit 15, and the sound pressure comparison section 151 compares the sound pressure of the voice acquired by the microphone 11c with the sound pressure of the voice acquired by the microphone 11d (step 103). Then, from the comparison result of the sound pressure of the voice acquired by the third microphone 11c and the sound pressure of the voice acquired by the fourth microphone 11d among the comparison results of the sound pressure comparison section 151, the voice signal selection section 152 determines that one of the third and fourth microphones 11c and 11d with larger sound pressure faces the outside of the wearer. In addition, the voice signal selection section 152 selects the information regarding a voice signal of the voice acquired by the microphone determined to have a larger sound pressure (step 104).

That is, in the positional relationship between the third and fourth microphones 11c and 11d, voice acquisition is performed more satisfactorily when the microphone faces the outside of the wearer than when the microphone faces the inside of the wearer. For this reason, when the microphone faces the outside of the wearer, the sound pressure is more increased. Therefore, when the sound pressure of the voice acquired by the third microphone 11c is larger than the sound pressure of the voice acquired by the fourth microphone 11d, it may be determined that the third microphone 11c faces the outside. In addition, it may be determined that the wearing state of the terminal apparatus 10 in this case is the same as in the case shown in FIG. 6A.

In contrast, when the sound pressure of the voice acquired by the fourth microphone 11d is larger than the sound pressure of the voice acquired by the third microphone 11c, it may be determined that the fourth microphone 11d faces the outside. In addition, it may be determined that the wearing state of the terminal apparatus 10 in this case is the same as in the case shown in FIG. 6B.

Then, on the basis of the determination result of the sound pressure comparison section 151, the positional relationship determination section 153 determines the positional relationship between the microphones 11a and 11b (step 105). That is, the positional relationship between the microphones 11a and 11b is either the case described in FIG. 6A or the case described in FIG. 6B. As described above, the comparison result of the sound pressure comparison section 151 indicates one of these cases. From this, the positional relationship between the microphones 11a and 11b is known. That is, the positional relationship determination section 153 determines the positional relationship in the horizontal direction between the microphones 11a and 11b, which are provided in the strap 40, from the determination result of the sound pressure comparison section 151.

Then, the speaker identification section 154 identifies whether the speaker is the wearer or others, who are persons other than the wearer (speaker identification) (step 106). In this case, between the microphones 11c and 11d placed in the body 30, the microphone which faces the outside of the wearer and is selected by the voice signal selection section 152 is used. If the microphone facing the inside of the wearer is used, the voice acquisition state is deteriorated. In this case, a correct speaker identification result may not be obtained. Therefore, the sound pressure of the voice acquired by the third microphone 11c is used when the wearing state of the terminal apparatus 10 is as shown in FIG. 6A, and the sound pressure of the voice acquired by the fourth microphone 11d is used when the wearing state of the terminal apparatus 10 is as shown in FIG. 6B.

In addition, when the speaker identification section 154 identifies that the speaker is the wearer (that is, when the speaker identification section 154 determines that the speaker is not others) (No in step 107), the process returns to step 101. On the other hand, when the speaker identification section 154 identifies that the speaker is others (Yes in step 107), the face-to-face angle output section 155 calculates first the time difference $\Delta t$ when the voice of the speaker reaches the first and second microphones 11a and 11b using the method described in FIG. 5 (step 108). In addition, using the method described in FIG. 4, the face-to-face angle output section 155 calculates the face-to-face angle $\alpha$, which is an angle between the wearer and the speaker facing each other, on the basis of the time difference $\Delta t$ and the distance D between the first and second microphones 11a and 11b (step 109). In this case, the positional relationship between the first and second microphones 11a and 11b determined by the positional relationship determination section 153 is used. That is, the face-to-face angle $\alpha$ is calculated taking into consideration that the first microphone 11a is located on the left side and the second microphone 11b is located on the right side when viewed from the wearer as shown in FIG. 6A while the first microphone 11a is located on the right side and the second microphone 11b is located on the left side when viewed from the wearer as shown in FIG. 6B.

Then, information regarding a voice signal of the voice including the information of the face-to-face angle $\alpha$ or the speaker identification result is output to the host apparatus 20 through the data transmission unit 16 (step 110). In this case, the data transmission unit 16 selects and transmits the information regarding a voice signal of the voice acquired by the microphone placed on the surface that faces the outside of the wearer. In addition, for the microphones 11a and 11b, information regarding the voice signal of the voice is transmitted corresponding to the positional relationship in the horizontal direction determined by the positional relationship determination section 153.

By the voice analysis system 1 described in detail up to now, the speaker identification result and the face-to-face angle information may be used as information that determines the relationship between the wearer and the speaker.

Here, as the relationship between the wearer and the speaker, for example, communication relationship between the wearer and the speaker is determined. For example, if the wearer and the speaker are located close to each other and it may be seen from the face-to-face angle information that the wearer and the speaker face each other, a possibility that the wearer and the speaker will be in conversation is high. In addition, if the wearer and the speaker face away from each other, a possibility that the wearer and the speaker will not be in conversation is high. In practice, other information such as timing or the interval of acquisition of the voice of the speaker or the wearer is also used for the above determination. In addition, as the relationship between the wearer and the speaker, for example, relationship in which one of them looks down on the other one from above may also be determined using the face-to-face angle in the vertical direction. In addition, the positional relationship or the like between plural persons in conversation may also be determined on the basis of the information from the plural terminal apparatuses 10.

In addition, although the speaker identification or the output of the face-to-face angle is performed by the terminal apparatus 10 in the example described above, the speaker identification or the output of the face-to-face angle may also be performed by the host apparatus 20 without being limited to this. In the voice analysis system 1 in this form, the functions of the speaker identification section 154 and the face-to-face angle output section 155 performed in the voice analysis unit 15 are performed in the data analysis unit 23 of the host apparatus 20, for example, unlike the voice analysis system 1 shown in FIG. 1. Moreover, in this case, the data analysis unit 23 functions as a speaker identification section that identifies whether the speaker is a wearer or others.

Explanation Regarding a Program

The processing performed by the terminal apparatus 10 in the present exemplary embodiment, which has been described in FIG. 8, is realized by cooperation of software and hardware resources. That is, a CPU (not shown) in a computer for control provided in the terminal apparatus 10 executes a program, which realizes each function of the terminal apparatus 10, to realize each of the above functions.

Therefore, the processing performed by the terminal apparatus 10 which has been described in FIG. 8 may be regarded as a program causing a computer to realize: a function of acquiring the voice of a speaker from the plural microphones 11c and 11d placed on both surfaces of the plate-shaped body 30; a function of comparing the sound pressure of the voice acquired by the third microphone 11c placed on one surface of the body 30 with the sound pressure of the voice acquired by the fourth microphone 11d placed on the other surface; and a function of selecting the information regarding a voice signal of the voice acquired by the microphone and determined to have a larger sound pressure.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. A voice analyzer comprising:
    a plate-shaped body;
    a plurality of first voice acquisition units that are placed on both surfaces of the plate-shaped body and that acquire a voice of a speaker;
    a sound pressure comparison unit that compares sound pressure of a voice acquired by a first voice acquisition unit placed on one surface of the plate-shaped body with sound pressure of a voice acquired by a first voice acquisition unit placed on the other surface of the plate-shaped body and determines a larger sound pressure;
    a voice signal selection unit that selects information regarding a voice signal that is associated with the larger sound pressure and is determined by the sound pressure comparison unit;
    a string member that is strap shaped, the string member connected to the plate-shaped body and used so that the plate-shaped body may be hung from a neck of a wearer of the voice analyzer; and
    a positional relationship determination unit that determines that the first voice acquisition unit for the voice signal selected by the voice signal selection unit faces an outside of the wearer.

2. The voice analyzer according to claim 1, further comprising:
    a plurality of second voice acquisition units that are provided in the string member,
    wherein the second voice acquisition units are associated with positional relationship in a horizontal direction between the second voice acquisition units provided in the string member and positional relationship between the first voice acquisition units placed on both the surfaces of the plate-shaped body.

3. The voice analyzer according to claim 1,
    wherein the string member is connected to the plate-shaped body in a state where both ends of the string member are separated from each other by a predetermined distance in a horizontal direction of the plate-shaped body.

4. The voice analyzer according to claim 2, further comprising:
    a speaker identification unit that identifies whether the speaker is the wearer or others on the basis of a sound pressure difference between voices acquired by two voice acquisition units whose distances from a mouth of the wearer are different among the voice acquisition units.

5. The voice analyzer according to claim 3, further comprising:
    a speaker identification unit that identifies whether the speaker is the wearer or others on the basis of a sound pressure difference between voices acquired by two voice acquisition units whose distances from a mouth of the wearer are different among the voice acquisition units.

6. A voice analysis system comprising:
a voice analysis unit that includes:
a plate-shaped unit body;
a string member that is strap shaped, the string member connected to the plate-shaped body and used so that the plate-shaped body may be hung from a neck of a wearer of the voice analyzer;
a plurality of voice acquisition sections that are placed on both surfaces of the plate-shaped unit body and that acquire a voice of a speaker;
a sound pressure comparison section that compares sound pressure of a voice acquired by a voice acquisition section placed on one surface of the unit body with sound pressure of a voice acquired by a voice acquisition section placed on the other surface of the unit body and determines a larger sound pressure;
a voice signal selection section that selects information regarding a voice signal that is associated with the larger sound pressure and is determined by the sound comparison unit;
a signal receiving unit that receives the information regarding the voice signal; and
a positional relationship determination unit that determines that the voice acquisition section for the voice signal selected by the voice signal selection unit faces an outside of the wearer.

7. A non-transitory computer readable medium storing a program causing a computer to perform a process,
the process comprising:
acquiring a voice of a speaker from a plurality of voice acquisition units that are placed on both surfaces of a plate-shaped body connected to a string member so that the plate-shaped body may be hung from the neck of a wearer;
comparing sound pressure of a voice acquired by a voice acquisition unit placed on one surface of the plate-shaped body with sound pressure of a voice acquired by a voice acquisition unit placed on the other surface of the plate-shaped body and determining a larger sound pressure;
selecting information regarding a voice signal that is associated with the larger sound pressure and is determined by the sound pressure comparison; and
determining that the voice acquisition unit for the selected voice signal faces an outside of the wearer.

8. The voice analyzer according to claim 4,
wherein the speaker identification unit identifies whether the speaker is the wearer or others based on the first voice acquisition unit that is determined to face the outside and not based on the first voice acquisition unit that is not determined to face the outside.

* * * * *